(12) United States Patent
Inagaki et al.

(10) Patent No.: US 6,383,688 B1
(45) Date of Patent: May 7, 2002

(54) ELECTROLYTE FOR LITHIUM CELLS AND METHOD OF PRODUCING THE SAME

(75) Inventors: Hiroyuki Inagaki, Ohi-machi; Satoshi Asano, Asaka; Masatoshi Horii, Yokohama; Hiroshi Furukawa, Kawagoe; Tadashi Niwa, Kamifukuoka, all of (JP)

(73) Assignee: Tonen Corporation, Tokyo (JP)

( * ) Notice: Subject to any disclaimer, the term of this patent is extended or adjusted under 35 U.S.C. 154(b) by 0 days.

(21) Appl. No.: 09/582,476

(22) PCT Filed: Dec. 24, 1998

(86) PCT No.: PCT/JP98/05889

§ 371 Date: Aug. 14, 2000

§ 102(e) Date: Aug. 14, 2000

(87) PCT Pub. No.: WO99/34471

PCT Pub. Date: Jul. 8, 1999

(30) Foreign Application Priority Data

Dec. 26, 1997 (JP) .............................................. 9-366958

(51) Int. Cl.$^7$ ............................................. H01M 10/40
(52) U.S. Cl. .................. 429/322; 429/231.95; 429/188; 429/324; 429/328; 429/329; 429/339; 429/231.1
(58) Field of Search ............................. 429/322, 231.95, 429/231.1, 188, 324, 339, 328, 329

(56) References Cited

FOREIGN PATENT DOCUMENTS

JP          10338653 A   * 12/1998   ........... C07B/63/00

* cited by examiner

*Primary Examiner*—Gabrielle Brouillette
*Assistant Examiner*—Angela J Martin
(74) *Attorney, Agent, or Firm*—Pitney, Hardin, Kipp & Szuch LLP

(57) ABSTRACT

The present invention relates to a method of removing water and a free acids content in an electrolytic solution for a lithium battery, and to an electrolytic solution for a lithium battery having a low water content and acids content. The present method is characterized by comprising steps of (a) leading an inert gas through the solvent having a water content of 100 ppm or lower under heating of the solvent to vaporize water together with the solvent to thereby reduce the water content of the solvent, and (b) dissolving the lithium electrolyte in the solvent while maintaining a temperature of the solvent at 20° C. or lower. The present method can make the water content at most 3 ppm and the free acids content less than 1 ppm.

7 Claims, No Drawings

ELECTROLYTE FOR LITHIUM CELLS AND METHOD OF PRODUCING THE SAME

This application is a 371 of PCT/JP98/05889, filed Dec. 24, 1998.

FIELD OF THE INVENTION

The present invention relates to an electrolytic solution for lithium batteries. More specifically, the present invention relates to a method of removing water and free acids from an electrolytic solution for lithium batteries and to an electrolytic solution having a low water content and a low free acids content.

Prior Art

For lithium batteries, a non-aqueous electrolytic solution comprising a lithium electrolyte such as lithium hexafluorophosphate, $LiPF_6$, in a non-aqueous organic solvent is used as an electrolytic solution. It is difficult to completely remove water contained in the solvent or in the electrolyte as an impurity, and water may further be introduced during storage of the electrolytic solution or a filling process of the electrolytic solution in batteries.

Further, a trace amount of free acids may be contained as impurities. Especially when an electrolyte which can be hydrolyzed or thermally decomposed with ease, such as $LiPF_6$ or the like, is used, hydrofluoric acid is produced by hydrolysis with a trace amount of water or thermal decomposition due to dissolution heat. This hydrofluoric acid not only decreases a capacity of a battery or degrades charge-discharge cycle characteristics, but also corrodes the inside of the battery.

As methods of removing water in an electrolytic solution, the use of metal oxide such as molecular sieves, phosphorus pentaoxide, activated alumina, and calcium oxide is described in Japanese Patent Application Laid-Open S59-9874; the use of molecular sieves of a lithium ion type is described in Japanese Patent Application Laid-Open S59-81869; and the use of activated alumina is described in Japanese Patent Publication H3-49180.

Meanwhile, to remove free acids, there are known the following methods: a method where acids are removed by adsorption with an adsorbent, such as aluminum oxide, contained in a battery, as described in Japanese Patent Application Laid-Open H4-28437 and Japanese Patent Application Laid-Open H5-315006; a method where acids are removed by distillation; a method where acids are removed by ammonium salt dissolved in an electrolytic solution, as described in Japanese Patent Application Laid-Open H3-119667; a method where acids are removed by neutralization with an alkaline agent such as lithium hydroxide and lithium hydride, as described in Japanese Patent Application Laid-Open H4-282563; and use is made of a metal fluoride, as described in Japanese Patent Application Laid-Open H8-321326.

However, the methods where water and free acids are removed by a solid powdery adsorbent contained in a battery are less preferred, because a design of the battery should be modified. The adsorption method with molecular sieves or the like has only a little effect of removing water or the like, when conducted alone, and an additional process for separating and recovering the used adsorbent is required.

Japanese Patent Application Laid-Open H1-286262 discloses a method of removing free acids by adding an organic lithium compound such as pentafluorophenyllithium to an electrolytic solution. The present inventors have found that additional generation of free acids is suppressed only in a short period of time.

Thus, the purpose of the present invention is to provide a method of removing water and free acids simultaneously from an electrolytic solution without a need of modifying designs of batteries and without separating and recovering an adsorbent used. Another purpose of the present invention is to provide a method where the effect of suppressing additional generation of free acids is maintained for a prolonged period of time. Still another purpose of the present invention is to provide an electrolytic solution where a water content and a free acids content are both low and to provide a lithium battery comprising the electrolytic solution.

DISCLOSURE OF THE INVENTION

The present invention is a method of preparing an electrolytic solution for a lithium battery, comprising dissolving a lithium electrolyte in a solvent comprising at least one organic solvent, characterized in that the method comprises steps of (a) leading an inert gas through the solvent having a water content of 100 ppm or lower under heating of the solvent to vaporize water together with the solvent to thereby reduce the water content of the solvent, and (b) dissolving the lithium electrolyte in the solvent while maintaining a temperature of the solvent at 20° C. or lower.

Preferably, the following step (c) follows after step (b), (c) incorporating at least one lithium compound in the electrolytic solution, said lithium compound being selected from the group consisting of lithium amide compounds represented by the formula, $LiNR^1R^2$, lithium imide compounds represented by the formula, $Li_2NR^3$, lithium borohydride and derivatives thereof represented by the formula, $LiBR^4R^5R^6R^7$, organic lithium compounds represented by $R^8Li$, lithium alkoxides represented by $R^9OLi$, and lithium aluminum hydride and derivatives thereof represented by $LiAlR^{10}R^{11}R^{12}R^{13}$, wherein each of said $R^1$–$R^3$ independently represents hydrogen or a hydrocarbon residue.

More preferably, each of said $R^1$–$R^{13}$ is at least one independently selected from the group consisting of hydrogen, alkyl, aryl, and allyl.

The present invention also relates to an electrolytic solution for a lithium battery prepared by incorporating a lithium electrolyte in a solvent comprising at least one organic solvent, characterized in that the electrolytic solution has a water content of 3 ppm or lower and a free acids content, converted as hydrofluoric acid, of less than 1 ppm.

Further, the present invention relates to a lithium battery comprising the electrolytic solution obtainable by the method according to the present invention.

PREFERRED EMBODIMENTS OF THE INVENTION

The present method comprises (a) a step of leading an inert gas through an organic solvent having a water content of at most 100 ppm at a room temperature under heating of the organic solvent. If the initial water content of the organic solvent is higher than 100 ppm, a larger amount of the inert gas is required to flow under heating, which is not preferred in terms of time and costs. To make the water content 100 ppm or less, any method may be used such as adsorption with an adsorbent such as molecular sieves, usual distillation under atmospheric pressure or distillation under a subatmospheric pressure, or purging with an inert gas. The water content can be determined by, for example, a Karl-Fisher method which will be described later in the specification.

Examples of the inert gas used in the present invention include nitrogen gas, helium gas, and argon gas, among which nitrogen gas is preferred in costs. Preferably, the inert gas contains substantially no water so as to show a dew point of −40° C. or lower, preferably −60° C. or lower.

The inert gas is led through a tube resistant to the organic solvent, such as a glass tube and a stainless tube. A flow rate may be set, depending on the amount of the solvent to be treated and a size of a container, but typically may be in the range of from 3 to 5 liters/minute for treating about 4 liters of the organic solvent.

By leading an inert gas through the organic solvent, the water content is made preferably 60 ppm or lower. Practically, the water content of from 40 to 60 ppm can be achieved. To make the water content less than 40 ppm, a larger volume of the inert gas and a longer treatment time are required, which may be disadvantageous in costs.

Examples of the organic solvent used in the present invention include dimethyl carbonate, diethyl carbonate, 1,2-dimethoxyethane, ethylene carbonate, methylethyl carbonate, propylene carbonate, γ-butyrolactone, sulfolane, tetrahydrofuran, 2-metylhydrofuran, dimethyl sulfoxide, dioxolan, dimethylformamide, acetonitrile or a mixture of two or more of them. Dimethyl carbonate and/or propylene carbonate are preferably used for their dielectric constants and viscosities.

When a mixture of two kinds of the organic solvents is used in the present invention, it is preferred to use a combination of at least one organic solvent having a boiling point below 100° C. with at least one organic solvent having a boiling point of 100° C. or higher. Among the above-mentioned organic solvents, those having a boiling point below 100° C. include, for example, dimethyl carbonate,and 1,2-dimethoxyetane. Those having a boiling point of 100° C. or higher include ethylene carbonate, methylethyl carbonate, diethyl carbonate, and propylene carbonate.

The above-described boiling point means a boiling point at atmospheric pressure. With a solvent having a boiling point below 100° C., water is made to vaporize easier as the solvent vaporizes or boils, so that a trace amount of water is removed. With a solvent having a boiling point of 100° C. or higher, a trace amount of water can be removed as the solvent vaporizes under heating at about 150° C.

By heating the solvent while continuously leading the inert gas through the solvent, a final water content can reach 3 ppm or less. The vaporized solvent may be recovered and used again.

Next, a lithium electrolyte is dissolved while maintaining a temperature of the solvent at 20° C. or lower, which is called step (b). Any known lithium electrolyte may be used such as $LiPF_6$, $LiClO_4$, $LiBF_4$, $LiAsF_6$, $LiSbF_6$, $LiAlCl_4$, and $LiCF_3SO_3$. Among these, $LiPF_6$ is preferred in battery performance.

The lithium electrolyte is dissolved in a concentration of from about 0.5 to 2.0 moles/liter, preferably 0.7 to 1.5 moles/liter, more preferably 0.8 to 1.2 moles/liter in an atmosphere of an inert gas. In this step, a temperature of the solvent is-maintained at 20° C. or lower, preferably 18° C. or lower. By doing so, thermal decomposition due to a heat of dissolution can be prevented. The temperature can be maintained at 20° C. or lower by controlling the amount of the electrolyte to be added while monitoring the temperature of the solvent, and/or using a known means for cooling such as an electronic cooler.

Preferably, water or acids are further removed by adding such an adsorbent to the obtained electrolytic solution, as molecular sieves, activated carbon, activated alumina, and magnesium oxide. More preferably, following the above step (b), step (c) is performed where at least one lithium compound is added to the electrolytic solution, which compound is selected from the group consisting of lithium amide compounds represented by the formula, $LiNR^1R^2$, lithium imide compounds represented by the formula, $Li_2NR^3$, lithium borohydride and derivatives thereof represented by the formula, $LiBR^4R^5R^6R^7$, organic lithium compounds represented by $R^8Li$, lithium alkoxides represented by $R^9OLi$, and lithium aluminum hydride and derivatives thereof represented by $LiAlR^{10}R^{11}R^{12}R^{13}$, wherein each of $R^1$–$R^{13}$ independently represents hydrogen or a hydrocarbon residue. By adding the lithium compound, not only the acid content is reduced but also additional generation of acids is suppressed, and consequently, the free acid content which has been reduced by the above-described steps (a) and (b) can be maintained for a prolonged period of time.

Preferably, each of $R^1$–$R^{13}$ is independently selected from the group consisting of hydrogen, alkyl, aryl, and allyl. More preferably, each of $R^1$–$R^{13}$ is selected from the group consisting of alkyl, aryl, and allyl having 1 to 6 carbon atoms.

Examples of the lithium amid compounds represented by the formula, $LiNR^1R^2$, include $LiNH_2$, $LiN(CH_3)_2$, $LiN(CH_3)(C_2H_5)$, $LiN)(C_2H_5)_2$, $LiN(n-C_3H_7)_2$, $LiN(CH(CH_3)_2)_2$, $LiN(n-C_4H_9)_2$, $LiN(C_5H_{11})_2$, $LiN(C_6H_{13})_2$, $LiN(C_6H_{11})_2$, $LiN(C_6H_5)_2$ and the following compounds:

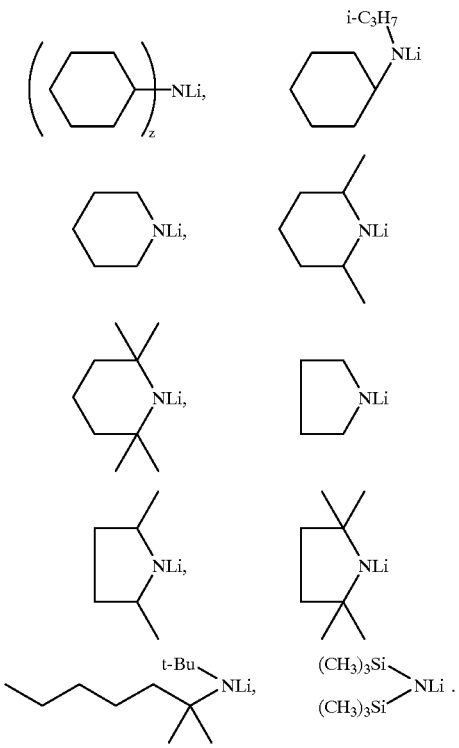

Examples of the lithium imide compounds represented by the formula, $Li_2NR^3$, include $Li_2NH$, and $Li_2NCH_3$.

Examples of the lithium borohydride and derivatives thereof represented by the formula, $LiBR^4R^5R^6R^7$, include $LiBH_4$, $LiB(C_2H_5)_3H$, and $LiB(C_4H_9)_3H$.

Examples of the organic lithium compounds represented by $R^8Li$ include $CH_3Li$, $C_2H_5Li$, $n\text{-}C_4H_9Li$, $s\text{-}C_4H_9Li$, $t\text{-}C_4H_9Li$, $(C_6H_5)_3CLi$, $C_6H_5CH_2Li$, $(CH_3)_2NCH_2Li$, $CH_2{=}CHLi$, $CH_2{=}CHCH_2Li$, $Cl_3CLi$, $C_6H_5Li$ and the following compounds:

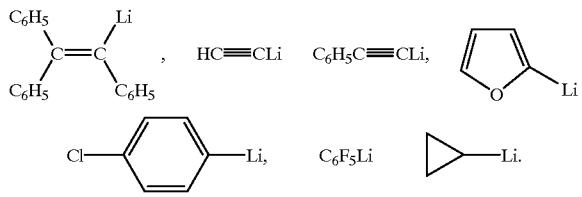

An example of the lithium alkoxides represented by $R^9OLi$ is $C_6H_5OLi$.

Examples of the lithium aluminum hydride represented by $LiAlR^{10}R^{11}R^{12}R^{13}$ and derivatives thereof include $LiAlH_4$, $LiAl(C_2H_5)_3H$, and $LiAl(C_4H_9)_3H$.

These compounds are readily soluble in an organic solvent used for an electrolytic solution and have a high reactivity with water or free acids, while they are inert to the electrolytes or active materials of electrodes.

The present electrolytic solution can be prepared by adding and dissolving at least one of these compounds in an electrolytic solution comprising a lithium[]electrolyte in an atmosphere of an inert gas. Its amount to be added is determined as desired, depending on active materials of a battery, composition of the electrolytic solution or the like, but typically is about 1 to 50 molar equivalents, preferably 1 to 25 molar equivalents, and more preferably 1 to 10 molar equivalents, per mole of the total of water and free acids, converted as hydrofluoric acid. If the amount is less than the above-mentioned lower limit, no effect is attained. If the amount is larger than the above-mentioned higher limit, problems may arise, for example, insolubility. Usually, 1.3 to 2.0 molar equivalents, for instance, about 1.5 molar equivalents may be enough to attain the present effects, but a larger amount in the aforesaid range may be added.

The present electrolytic solution is characterized by a water content of 3 ppm or less and a free acids content converted as hydrofluoric acid, of less than 1 ppm. The free acids content may be determined by, for example, neutralization titration in a non-aqueous solvent, as described in detail in the Examples.

A structure of the present lithium battery is not limited and may has any known structure of a lithium secondary battery. As an active material for an anode, for example, lithium metal or carbonaceous materials such as graphite can be used. In the present invention, a carbon electrode is preferred. As an active material for a cathode, metal oxide containing lithium ions such as $LiCoC_2$ and $LiNiO_2$ can be used. The battery may be constructed by placing the active material for a cathode such as $LiCoO_2$, opposite to the carbon electrode with a separator impregnated with the electrolytic solution interposed between the electrodes, and assembling under pressure an anode terminal of a flat can which is made of, for instance, stainless steel expanded metal and a cathode terminal with collectors being interposed between each of the terminals and the electrodes.

EXAMPLES

The present invention will be described in detail with reference to the following Examples.

Method for Determining a Water Content and a Free Acids Content

In the Examples and the Comparative Examples, a water content was determined by a Karl-Fisher method with a coulometric moisture analyzer. A free acids content was determined by weighing 20 g of a sample, adding a few drops of a 0.1% bromothymol blue solution in ethanol as an indicator and quantitatively analyzing it by neutralization titration with a 0.01 N sodium methoxide solution in methanol. The resultant equivalent amount of acids was converted into the amount of hydrofluoric acid.

Example 1

Commercially available dimethyl carbonate (hereinafter referred to as DMC) and propylene carbonate (hereinafter referred to as PC) were used. The initial water content of the solvents were 736 ppm and 494 ppm, respectively. Through 4 liters of each of the solvents, dried nitrogen gas was led via a glass capillary at a flow rate of 3 liters/minute at room temperature for 24 hours. The resultant water content of each of the solvents was 55 ppm and 12 ppm, respectively. The both solvents were heated for 3 hours while continuing the nitrogen gas flow. Then, the final water content of each of the solvents was 1.3 ppm and 0.8 ppm, respectively.

After cooling both of the above solvents in a thermostat to about 18° C., they were mixed together in a volume ratio of 4:6. In the mixed solvent, lithium hexafluorophosphate was dissolved in a concentration of 1 mole/liter in a nitrogen gas atmosphere in a manner where the rate of the addition of lithium hexafluorophosphate was controlled so that the temperature of the solvent did not exceed 20° C. The water content of the resultant electrolytic solution was 2 ppm and the free acids content, converted to hydrofluroric acid content, was 7 ppm. This electrolytic solution will be referred to as Electrolytic Solution-A.

To Electrolytic Solution-A, n-butyllithium($n\text{-}C_4H_9Li$) was added in a concentration of 40 ppm which corresponded to about 1.5 times a molar equivalent to the total of the aforesaid water and the free acids and was allowed to stand at room temperature for 24 hours in a nitrogen gas atmosphere. The water content and the free acids content of the resultant electrolytic solution were both less than 1 ppm.

A change in the free acids content with time in the electrolytic solution was inspected. After 10 days, the free acids content was still less than 1 ppm and, thus, no increase was found.

Examples 2–9

In the Examples 2–9, electrolytic solutions were prepared in the same manner as in Example 1 except that, instead of $n\text{-}C_4H_9Li$, use was made of about 1.5 times a molar equivalent to the total of the aforesaid water and the free acids of $t\text{-}C_4H_9Li$, $C_6H_5Li$, $LiN(CH(CH_3)_2)_2$, $LiN(n\text{-}C_4H_9)_2$, $C_6H_5OLi$, $LiBH_4$, and $LiAlH_4$, respectively. The water content and the free acids content of the resultant electrolytic solution were both less than 1 ppm.

A change in the free acids content with time in the electrolytic solution was inspected. After 10 days, the free acids content was still less than 1 ppm and, thus, no increase was found.

Example 10

An electrolytic solution was prepared in the same manner as in Example 1 except that 1,2-dimethoxyethane was used instead of DMC. The water content and the free acids content of the resultant electrolytic solution were both less than 1 ppm.

A change in the free acids content with time in the electrolytic solution was inspected. After 10 days, the free acids content was still less than 1 ppm and, thus, no increase was found.

Comparative Example 1

An electrolytic solution was prepared by dissolving lithium hexafluorophosphate in a concentration of 1 mole/liter in a mixed solvent of DMC and PC (volume ratio, 4:6). Here, a nitrogen-gas atmosphere was not used, and the solvent was not cooled. The resultant electrolytic solution had a water content of 20 ppm and a free acids content, converted to hydrofluoric acid content, of 24 ppm. This electrolytic solution will be referred to as Electrolytic Solution-B.

To Electrolytic Solution-B, n-butyllithium was added in a concentration of 200 ppm which corresponded to about 1.5 times a molar equivalent to the total of the aforesaid water and free acids and was allowed to stand at room temperature for 24 hours in a nitrogen gas atmosphere. The resultant electrolytic solution had a water content of 6 ppm and a free acids content of 5 ppm.

A change in the free acids content with time was inspected. After 10 days, the free acids content amounted to 28 ppm, which is higher than the initial content.

Comparative Example 2

An electrolytic solution was prepared in the same manner as in Comparative Example 1 except that, instead of n-butyllithium, molecular sieves calcined at 500° C. in a nitrogen gas atmosphere was added in a concentration of 5 wt % in a nitrogen gas atmosphere at room temperature and was allowed to stand for 24 hours. The resultant electrolytic solution had a water content of 6 ppm and a free acids content of 16 ppm.

A change in the free acids content with time was inspected. After 24 days, the free acids content amounted to 24 ppm, which is higher than the initial content.

INDUSTRIAL APPLICABILITY

With the present invention, one can remove water and free acids simultaneously without modifying a design of a lithium battery and without separating and recovering an adsorbent. Further, by adding a lithium compound such as butyllithium, one can reduce the free acids content to less than 1 ppm and maintain such a low content for a long time.

The present electrolytic solution is advantageously used for lithium secondary batteries.

What is claimed is:

1. A method of preparing an electrolytic solution for a lithium battery, comprising dissolving a lithium electrolyte in a solvent comprising at least one organic solvent, characterized in that the method comprises steps of (a) leading an inert gas through the solvent having a water content of 100 ppm or lower under heating of the solvent to vaporize water together with the solvent to thereby reduce the water content of the solvent, and (b) dissolving the lithium electrolyte in the solvent while maintaining a temperature of the solvent at 20° C. or lower.

2. The method of preparing an electrolytic solution for a lithium battery according to claim 1, wherein the following step (c) follows after step (b), (c) incorporating at least one lithium compound in the electrolytic solution, said lithium compound being selected from the group consisting of lithium amide compounds represented by the formula, $LiNR^1R^2$, lithium imide compounds represented by the formula, $Li_2NR^3$, lithium borohydride and derivatives thereof represented by the formula, $LiBR^4R^5R^6R^7$, organic lithium compounds represented by $R^8Li$, lithium alkoxides represented by $R^9OLi$, and lithium aluminum hydride and derivatives thereof represented by $LiAlR^{10}R^{11}R^{12}R^{13}$, wherein each of $R^1$–$R^{13}$ independently represents hydrogen or a hydrocarbon residue.

3. The method of preparing an electrolytic solution for a lithium battery according to claim 2, wherein each of $R^1$–$R^{13}$ is at least one independently selected from the group consisting of hydrogen, alkyl, aryl, and allyl.

4. An electrolytic solution for a lithium battery prepared by incorporating a lithium electrolyte in a solvent comprising at least one organic solvent, characterized in that the electrolytic solution has a water content of 3 ppm or lower and a free acids content, converted as hydrofluoric acid, of less than 1 ppm.

5. An electrolytic solution for a lithium battery obtainable by the method according to claim 1.

6. A lithium battery comprising the electrolytic solution according to claim 4.

7. A lithium battery comprising the electrolytic solution according to claim 5.

* * * * *